United States Patent
Ina et al.

(10) Patent No.: US 11,150,520 B2
(45) Date of Patent: Oct. 19, 2021

(54) LIQUID CRYSTAL DISPLAY DEVICE

(71) Applicant: SHARP KABUSHIKI KAISHA, Sakai (JP)

(72) Inventors: Keiichi Ina, Sakai (JP); Takashi Satoh, Sakai (JP); Takahiro Sasaki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/169,282

(22) Filed: Feb. 5, 2021

(65) Prior Publication Data

US 2021/0255509 A1    Aug. 19, 2021

(30) Foreign Application Priority Data

Feb. 13, 2020    (JP) .............................. JP2020-022156

(51) Int. Cl.
  *G02F 1/1337*    (2006.01)
  *G02F 1/1343*    (2006.01)
  *G02F 1/137*     (2006.01)
  *G02F 1/1335*    (2006.01)

(52) U.S. Cl.
  CPC .... *G02F 1/133773* (2021.01); *G02F 1/13439* (2013.01); *G02F 1/13712* (2021.01); *G02F 1/133555* (2013.01); *G02F 1/133742* (2021.01); *G02F 1/133765* (2021.01)

(58) Field of Classification Search
  None
  See application file for complete search history.

(56) References Cited

U.S. PATENT DOCUMENTS

| | | |
|---|---|---|
| 6,341,002 B1 | 1/2002 | Shimizu et al. |
| 2011/0051061 A1* | 3/2011 | Sakai ................. G02B 5/3083 349/117 |
| 2012/0154736 A1 | 6/2012 | Nagasawa et al. |
| 2012/0162594 A1 | 6/2012 | Tamaki et al. |
| 2012/0313906 A1 | 12/2012 | Tamaki et al. |
| 2016/0077394 A1 | 3/2016 | Nagasawa et al. |
| 2016/0195752 A1 | 7/2016 | Tamaki et al. |
| 2018/0203307 A1 | 7/2018 | Nagasawa et al. |

FOREIGN PATENT DOCUMENTS

| | | |
|---|---|---|
| JP | 2000-122094 A | 4/2000 |
| JP | 2003-131268 A | 5/2003 |
| JP | 2012-145926 A | 8/2012 |
| JP | 2012-255908 A | 12/2012 |

* cited by examiner

*Primary Examiner* — Phu Vu
(74) *Attorney, Agent, or Firm* — ScienBiziP, P.C.

(57) ABSTRACT

Each pixel has a reflection region to produce a display in reflection mode. The first substrate includes: a pixel electrode for each pixel; and a first vertical alignment film. The second substrate includes: an opposite electrode opposite the pixel electrodes; and a second vertical alignment film. Of the first and second vertical alignment films, only the second vertical alignment film exerts an alignment-regulating force that determines a pretilt angle. Each pixel electrode includes a plurality of subpixel electrodes. The opposite electrode has an opening in an area corresponding to one of four corners of at least one of the plurality of subpixel electrodes. Liquid crystal molecules in a thickness-wise middle portion of the liquid crystal layer on the subpixel electrode are oriented toward the opening.

8 Claims, 9 Drawing Sheets

BLACK DISPLAY | DARK GRAY-LEVEL DISPLAY | BRIGHT GRAY-LEVEL DISPLAY | WHITE DISPLAY

FIG.5A

AFTER SWITCHING FROM BLACK DISPLAY TO DARK GRAY-LEVEL DISPLAY

AFTER SWITCHING FROM WHITE DISPLAY TO DARK GRAY-LEVEL DISPLAY

ALIGNMENT SINGULARITY

DARK LINE NOT PULLED INTO SUBPIXELS

FIG.5B

AFTER SWITCHING FROM BLACK DISPLAY TO DARK GRAY-LEVEL DISPLAY/ AFTER SWITCHING FROM WHITE DISPLAY TO DARK GRAY-LEVEL DISPLAY

LIQUID CRYSTAL DISPLAY DEVICE

CROSS-REFERENCE TO RELATED APPLICATION

The present application claims priority from Japanese Application JP 2020-022156, filed Feb. 13, 2020, the content to which is hereby incorporated by reference into this application.

BACKGROUND

1. Technical Field

The disclosure relates generally to liquid crystal display devices and in particular to liquid crystal display devices including pixels each having a reflection region.

2. Description of the Related Art

Liquid crystal display devices can be roughly classified into two types: transmissive and reflective. The transmissive liquid crystal display device relies on the light emitted by a backlight for a display in transmission mode. The reflective liquid crystal display device relies on ambient light for a display in reflection mode. Another type of liquid crystal display device is being proposed that includes pixels each having both a reflection region for a display in reflection mode and a transmission region for a display in transmission mode. This type of liquid crystal display device is called the transflective liquid crystal display device or the transmission/reflection combination type of liquid crystal display device.

The reflective and transflective liquid crystal display devices are suitably used in, for example, small to medium-sized mobile display devices for outdoor use. The reflective liquid crystal display device is disclosed, for example, in Japanese Unexamined Patent Application Publication No. 2000-122094. The transflective liquid crystal display device is disclosed, for example, in Japanese Unexamined Patent Application Publication No. 2003-131268.

Japanese Unexamined Patent Application Publication No. 2012-255908 discloses a transflective liquid crystal display device that uses interpixel regions for a display in transmission mode. The transflective liquid crystal display device disclosed in Japanese Unexamined Patent Application Publication No. 2012-255908 needs no transmission regions in the pixels thereof. This structure allows for an increased area of the reflection region, thereby producing a bright reflective display.

Some recent liquid crystal display devices include a memory circuit in each pixel (hence also referred to as "memory liquid crystal display devices") and allow for reductions in power consumption. The memory liquid crystal display device is disclosed, for example, in Japanese Unexamined Patent Application Publication No. 2012-145926. The memory liquid crystal display device uses binary information contained in the memory circuit of each pixel to produce a display. Japanese Unexamined Patent Application Publication No. 2012-145926 discloses an example where a pixel electrode is divided into a plurality of subpixel electrodes to achieve a four-gray-level display in each pixel by area coverage modulation.

SUMMARY

Studies for further improved display quality in the reflective liquid crystal display device as well as in the transflective liquid crystal display device show that display quality falls due to the bubbles generated by a color filter substrate. The inventors of the disclosure have thoroughly investigated the provision of openings in an electrode disposed on the color filter substrate ("opposite electrode") as a way of reducing the generation of these bubbles and found that display quality does not improve sufficiently if openings are provided simply in the opposite electrode. Specifically, as will be described later in more detail, when there are provided openings in the opposite electrode in a memory liquid crystal display device that operates by area coverage modulation, orientation becomes unstable in some regions (alignment singularities), which in turn causes, for example, image sticking, hence lower display quality.

In view of the foregoing problems, it is an object of the disclosure to restrain display quality from falling due to alignment singularities in liquid crystal display devices including pixels each having a reflection region.

The embodiments of the disclosure provide the liquid crystal display devices described in the following "aspects."

Aspect 1

A liquid crystal display device including: a first substrate; a second substrate opposite the first substrate; a liquid crystal layer between the first substrate and the second substrate; and a plurality of pixels each having a reflection region to produce a display in reflection mode, wherein the liquid crystal layer contains a nematic liquid crystal material with negative dielectric anisotropy and a chiral agent, the first substrate includes: a pixel electrode for each pixel; and a first vertical alignment film between the pixel electrodes and the liquid crystal layer, the second substrate includes: an opposite electrode opposite the pixel electrodes; and a second vertical alignment film between the opposite electrode and the liquid crystal layer, of the first vertical alignment film and the second vertical alignment film, only the second vertical alignment film exerts an alignment-regulating force that determines a pretilt angle, each pixel electrode includes a plurality of subpixel electrodes including at least two subpixel electrodes to which different voltages are applied, the opposite electrode has an opening in an area corresponding to one of four corners of at least one of the plurality of subpixel electrodes, and liquid crystal molecules in a thickness-wise middle portion of the liquid crystal layer on the at least one subpixel electrode are oriented toward the opening.

Aspect 2

The liquid crystal display device of aspect 1, wherein the opposite electrode has the opening in an area corresponding to one of four corners of each subpixel electrode.

Aspect 3

The liquid crystal display device of aspect 1, wherein the second substrate has a projection on the opposite electrode in an area corresponding to one of four corners of those subpixel electrodes other than the at least one of the plurality of subpixel electrodes.

Aspect 4

The liquid crystal display device of any one of aspects 1 to 3, wherein the pixel electrode is a reflective electrode made of a light-reflective conductive material.

Aspect 5

The liquid crystal display device of any one of aspects 1 to 4, wherein a region between any two adjacent pixels of the plurality of pixels is used for a display in transmission mode.

Aspect 6

The liquid crystal display device of any one of aspects 1 to 5, wherein the second substrate includes no black matrix between any two adjacent pixels of the plurality of pixels.

Aspect 7

The liquid crystal display device of any one of aspects 1 to 6, further including a plurality of memory circuits.

Aspect 8

The liquid crystal display device of aspect 7, wherein the plurality of memory circuits includes a first memory circuit and a second memory circuit for each pixel, and the plurality of subpixel electrodes includes a subpixel electrode connected to the first memory circuit and a subpixel electrode connected to the second memory circuit.

The embodiments of the disclosure restrain display quality from falling due to alignment singularities in liquid crystal display devices including pixels each having a reflection region.

DESCRIPTION OF EMBODIMENTS

The following will describe embodiments of the disclosure with reference to drawings. The disclosure is not limited to these embodiments.

Embodiment 1

Figure 1:
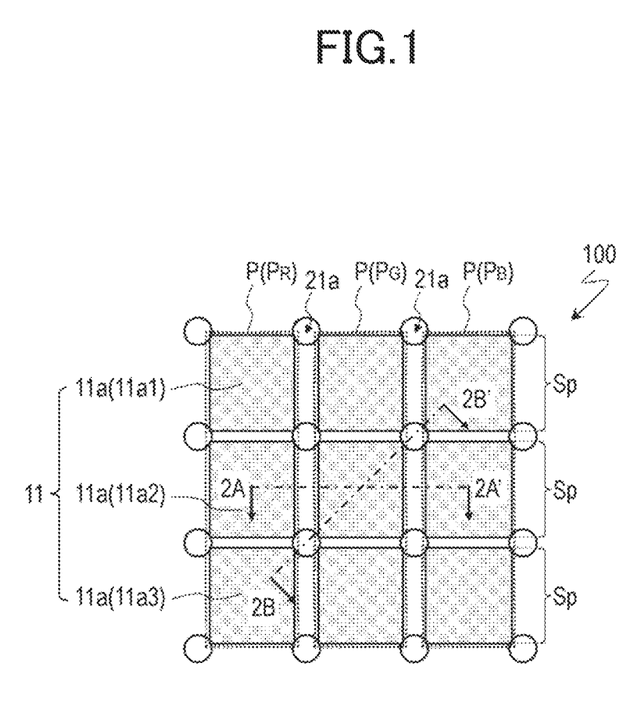
FIG. 1 is a schematic plan view of a liquid crystal display device 100 in accordance with an embodiment of the disclosure, illustrating regions for three pixels P in the liquid crystal display device 100.
Figure 2A:
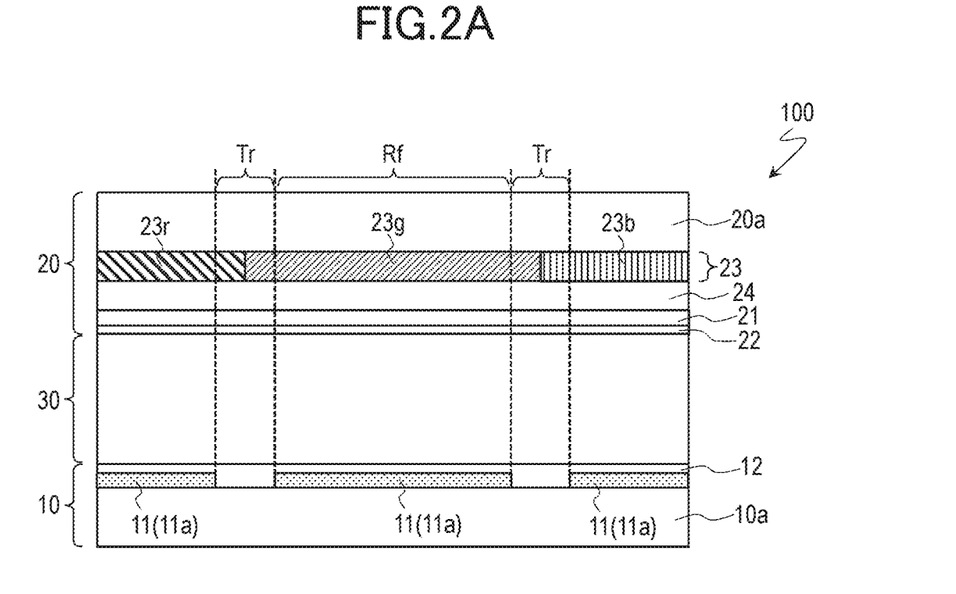
FIG. 2A is a schematic cross-sectional view of the liquid crystal display device 100, illustrating a cross-sectional structure thereof taken along line 2A-2A' shown in FIG. 1.
Figure 2B:
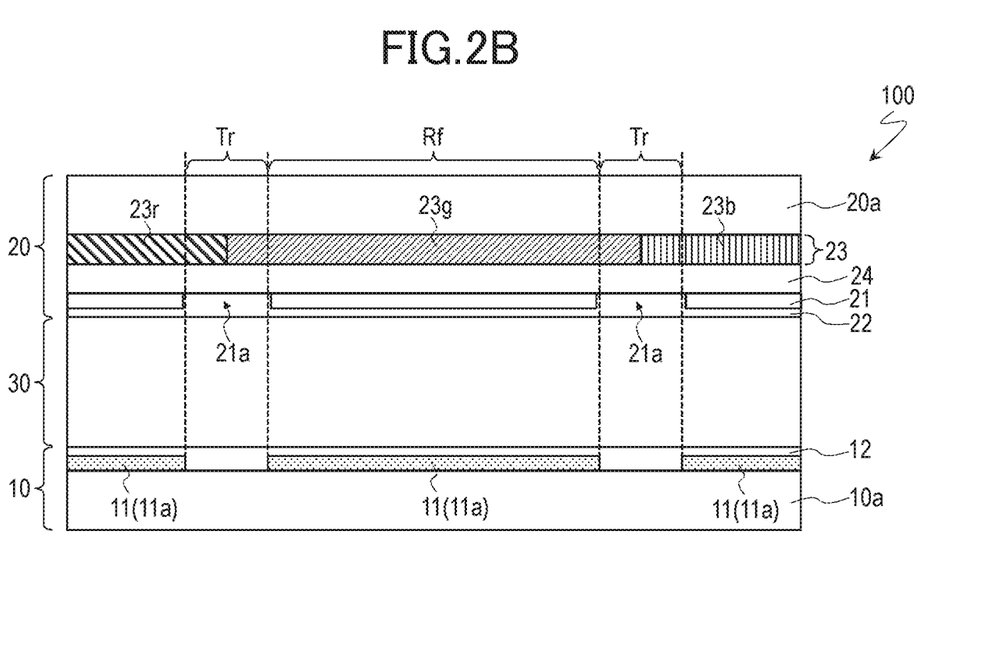
FIG. 2B is a schematic cross-sectional view of the liquid crystal display device 100, illustrating a cross-sectional structure thereof taken along line 2B-2B' shown in FIG. 1.

A description will be given of a liquid crystal display device 100 in accordance with the present embodiment with reference to FIGS. 1, 2A, and 2B. The liquid crystal display device 100 in accordance with the present embodiment is a transflective liquid crystal display device (transmission/reflection combination type of liquid crystal display device). FIG. 1 is a schematic plan view of the liquid crystal display device 100, illustrating regions for three pixels P in the liquid crystal display device 100. FIGS. 2A and 2B are schematic cross-sectional views of the liquid crystal display device 100, illustrating a cross-sectional structure thereof taken along lines 2A-2A' and 2B-2B' in FIG. 1 respectively.

The liquid crystal display device 100 includes the pixels P as shown in FIG. 1. The pixels P are arranged in a matrix of rows and columns (FIG. 1 shows the three pixels P arranged in a 1 row and 3 columns). Each pixel P consists typically of a red pixel $P_R$ for a display in red, a green pixel $P_G$ for a display in green, and a blue pixel $P_B$ for a display in blue.

The liquid crystal display device 100 includes a TFT substrate (first substrate) 10, an opposite substrate (second substrate) 20 opposite the TFT substrate 10, and a liquid crystal layer 30 interposed between the TFT substrate 10 and the opposite substrate 20, as shown in FIG. 2. The pixel P has a reflection region Rf in which a display is produced in reflection mode. A region between two adjacent pixels P is used for a display in transmission mode in the present embodiment (in other words, the region serves as a transmission region Tr).

The liquid crystal layer 30 contains a nematic liquid crystal material with negative dielectric anisotropy (i.e., negative nematic liquid crystal material) and a chiral agent. The liquid crystal layer 30 can be formed by, for example, instillation.

The TFT substrate 10 includes: pixel electrodes 11 for the respective pixels P; and a first vertical alignment film 12 between the pixel electrodes 11 and the liquid crystal layer 30. The elements constituting the TFT substrate 10, such as the pixel electrodes 11, are supported by a substrate 10*a* made of, for example, glass or plastic.

Circuitry for driving the pixels P (backplane circuit) (not shown) is formed on the substrate 10*a*. The backplane circuit here includes a plurality of memory circuits (e.g., SRAM). A specific structure of the liquid crystal display device including a memory circuit in each pixel (memory liquid crystal display device) is disclosed in, for example, Japanese Unexamined Patent Application Publication No. 2012-145926 (equivalent to U.S. Pat. No. 8,830,436). The entire contents of Japanese Unexamined Patent Application Publication No. 2012-145926 and U.S. Pat. No. 8,830,436 are incorporated herein by reference.

The pixel electrodes 11 are electrically connected to the backplane circuit including memory circuits. The pixel electrodes 11 are reflective electrodes made of a light-reflective conductive material. A preferred example of the conductive material for the reflective electrodes is a high reflectance metal material such as a silver alloy, aluminum, or an aluminum alloy.

The reflective electrodes (pixel electrodes 11) may have an irregular surface structure (not shown here), which diffuses ambient light and thereby produces a display similar to the paper white display. The irregular surface structure may be formed by, for example, a plurality of bumps that is randomly positioned such that the centers of adjacent bumps are separated from each other by a distance of from 5 μm to 50 μm, both inclusive, preferably by a distance of from 10 μm to 20 μm, both inclusive. The bumps are generally circular or polygonal when viewed normal to the substrate 10*a*. The bumps account for, for example, approximately 20% to 40% the area of the pixel P. The bumps have a height of, for example, from 1 μm to 5 μm, both inclusive. The insulation film (not shown here) provided directly below the pixel electrodes 11 may have bumps so that the pixel electrodes 11 can have an irregular surface that matches the bumps of the insulation film. In place of the irregular surface structure of the reflective electrodes, a light diffusion layer may be provided, for example, on the side of the liquid crystal layer 30 that faces the viewer, to produce a display similar to the paper white display.

Each pixel electrode 11 includes a plurality of generally rectangular subpixel electrodes 11*a*. Accordingly, since the pixel electrode 11 is divided into a plurality of subpixel electrodes 11*a*, each pixel P may be regarded as being divided into a plurality of subpixels Sp. FIG. 1 illustrates an example where the pixel P is divided into three subpixels Sp and the pixel electrode 11 is divided into three subpixel electrodes 11*a*. Of the three subpixel electrodes 11*a*, the top one (first subpixel electrode 11*a*1) and the bottom one (third subpixel electrode 11*a*3) in the FIG. 1 are electrically connected to a single common memory circuit, whilst the middle one (second subpixel electrode 11*a*2) in FIG. 1 is electrically connected to another memory circuit. Each pixel P thus has two memory circuits.

The opposite substrate 20 includes an opposite electrode 21 opposite the pixel electrodes 11 and a second vertical alignment film 22 between the opposite electrode 21 and the liquid crystal layer 30. The opposite substrate 20 further includes a color filter layer 23 and an overcoat layer 24. The elements constituting the opposite substrate 20, such as the opposite electrode 21, are supported by a substrate 20*a* made of, for example, glass or plastic. The opposite substrate 20 includes no black matrix (light-blocking layer) between any two adjacent pixels P.

The opposite electrode 21 is made of a transparent conductive material such as indium tin oxide (ITO), indium zinc oxide (IZO®), or a mixture of these oxides.

The color filter layer 23 typically includes a red color filter 23*r* in those regions corresponding to the red pixels $P_R$, a green color filter 23*g* in those regions corresponding to the green pixels $P_G$, and a blue color filter 23*b* in those regions corresponding to the blue pixels $P_B$. The regions of the color filter layer 23 that correspond to areas between pixels P of different colors are, for example, approximately equally divided by color filters of different colors.

The overcoat layer (planarization layer) 24 is made of, for example, a transparent resin material and provided in such a manner as to cover the color filter layer 23.

Both the first vertical alignment film 12 and the second vertical alignment film 22 are provided in such a manner as to be in contact with the liquid crystal layer 30. Of the first vertical alignment film 12 and the second vertical alignment film 22, the second vertical alignment film 22 alone exerts an alignment-regulating force that determines a pretilt angle in the present embodiment. In other words, the second vertical alignment film 22 is subjected to an alignment process (e.g., rubbing), whilst the first vertical alignment film 12 is not subjected to such a process.

The liquid crystal display device 100 further includes a pair of polarizers (not shown here) opposite each other with at least the liquid crystal layer 30 intervening therebetween. There may be provided a retarder between each polarizer and the liquid crystal layer 30. The pair of polarizers (as well as the retarders) is arranged in such a manner as to produce a display, for example, in normally black mode.

Figure 3A:
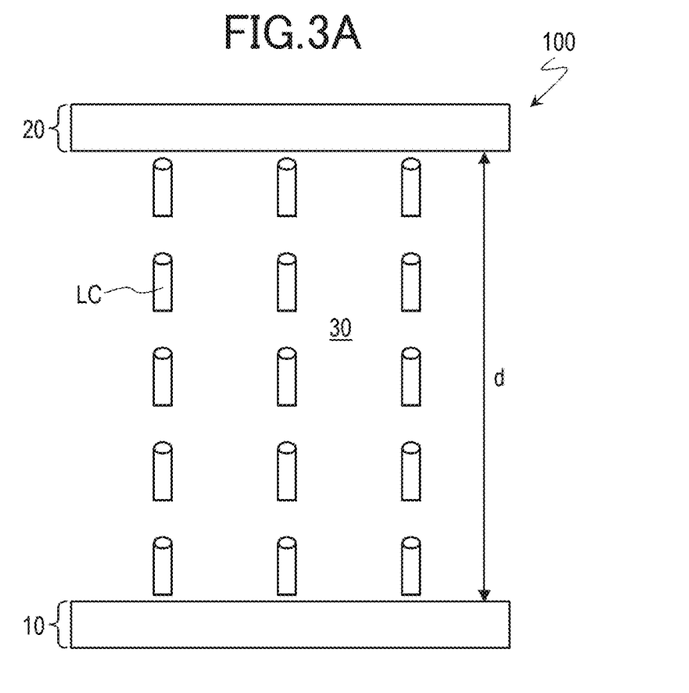
FIG. 3A is an illustration of the orientation of liquid crystal molecules LC when no voltage is being applied across a liquid crystal layer 30 in the liquid crystal display device 100.
Figure 3B:
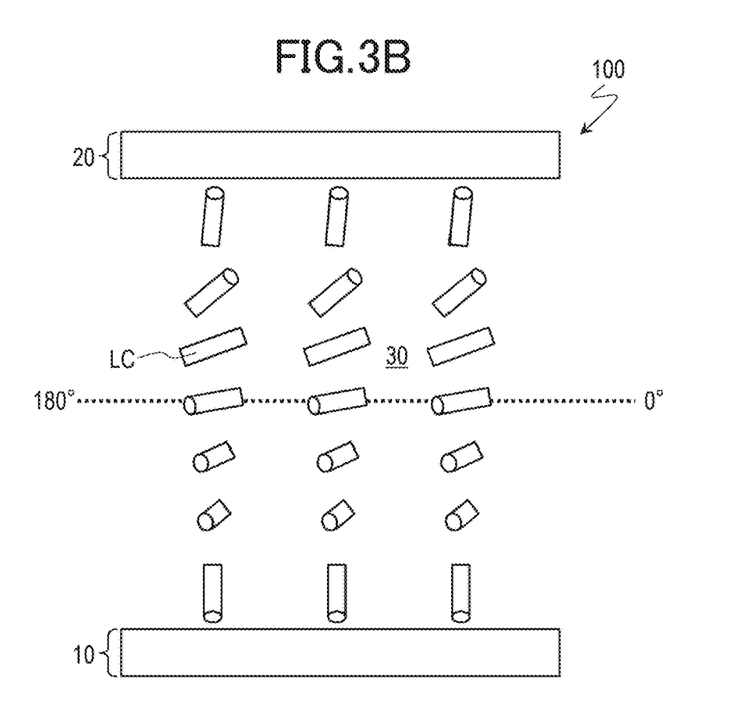
FIG. 3B is an illustration of the orientation of the liquid crystal molecules LC when a maximum gray level voltage (white display voltage) is being applied across the liquid crystal layer 30 in the liquid crystal display device 100.

The liquid crystal molecules in the liquid crystal layer 30 are vertically oriented when the liquid crystal layer 30 is under zero voltage and twisted when the liquid crystal layer 30 is under a prescribed voltage. FIG. 3A illustrates the orientation of liquid crystal molecules LC when no voltage is being applied across the liquid crystal layer 30. FIG. 3B illustrates the orientation of the liquid crystal molecules LC when a maximum gray level voltage (white display voltage) is being applied across the liquid crystal layer 30.

The liquid crystal display device 100 produces a black display in the absence of applied voltage (i.e., when the liquid crystal layer 30 is under a voltage lower than a threshold voltage) as shown in FIG. 3A. Under these conditions, the liquid crystal molecules LC in the liquid crystal layer 30 are vertically oriented by the alignment-regulating force exerted by the first vertical alignment film 12 and the second vertical alignment film 22. The liquid crystal molecules LC, which have negative dielectric anisotropy, tilt when the liquid crystal layer 30 is placed under a voltage (which is equal to the potential difference between the pixel electrode 11 and the opposite electrode 21). Since the second vertical alignment film 22 has been subjected to an alignment process (e.g., rubbing), those liquid crystal molecules LC close to the second vertical alignment film 22 tilt to an angle as regulated by the second vertical alignment film 22 (i.e., pretilt angle).

The liquid crystal layer 30 contains a mixture of a nematic liquid crystal material with negative dielectric anisotropy and a chiral agent. The liquid crystal molecules LC are twisted in a direction determined by the chiral agent. When the liquid crystal layer 30 is placed under the white display voltage, the liquid crystal molecules LC are twisted as shown in FIG. 3B.

The liquid crystal molecules LC in the liquid crystal layer 30 follow those liquid crystal molecules LC tilted to a pretilt angle determined by the second vertical alignment film 22 and are twisted in a direction determined by the chiral agent. Those liquid crystal molecules LC close to the first vertical alignment film 12 are oriented in a direction determined by the thickness (cell gap) of the liquid crystal layer 30 and by the chiral pitch (thickness of the liquid crystal layer 30 required for the liquid crystal molecules to be twisted) 360° that can vary depending on the type and quantity of the chiral agent.

Those liquid crystal molecules LC very close to the surfaces of the first vertical alignment film 12 and the second vertical alignment film 22 are under strong influence of the alignment-regulating force (polar angle anchoring) exerted by the vertical alignment films and are hence substantially vertically oriented under the white display voltage. Thus, since the liquid crystal molecule LC which is strongly alignment regulated by the first vertical alignment film 12 and the second vertical alignment film 22 exists, when the voltage is removed, the liquid crystal molecule LC reversibly returns to vertical orientation and thereby can display black.

The display mode in which only one of the vertical alignment films regulates the pretilt angle (azimuth) as in the present embodiment is termed VA-HAN mode. VA-HAN mode requires only one of the vertical alignment films to be subjected to an alignment process to exert a pretilt-angle-regulating force (azimuth anchoring force). VA-HAN mode therefore advantageously allows for simple and convenient manufacture than VA-TN mode in which both vertical alignment films regulate the pretilt angle.

Figure 3C:
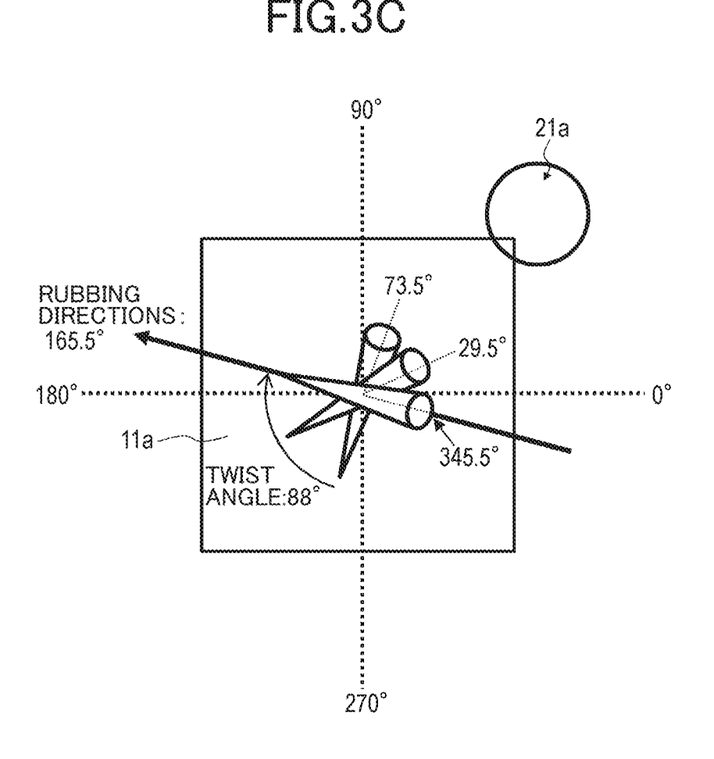
FIG. 3C is a plan view of the orientation shown in FIG. 3B as viewed from an opposite substrate 20.

FIG. 3C is a plan view of the orientation shown in FIG. 3B as viewed from the opposite substrate 20. Here, using the clock positions on the display face, the 3 o'clock direction is 0°, and the counterclockwise rotation is positive. FIG. 3B is an illustration of the orientation as viewed from the 270° direction shown in FIG. 3C.

When the second vertical alignment film 22 has a rubbing direction of 165.5°, the liquid crystal molecules LC are oriented to 345.5° near the opposite substrate 20. Under these conditions, assuming that the liquid crystal layer 30 has a thickness (cell gap) d (see FIG. 3A) of 2.8 μm and a chiral pitch of 9 μm, for example, the liquid crystal molecules LC are orientated to 29.5° in the thickness-wise middle portion of the liquid crystal layer 30 and to 73.5° near the TFT substrate 10 and have a twist angle of 88°.

Figure 4:
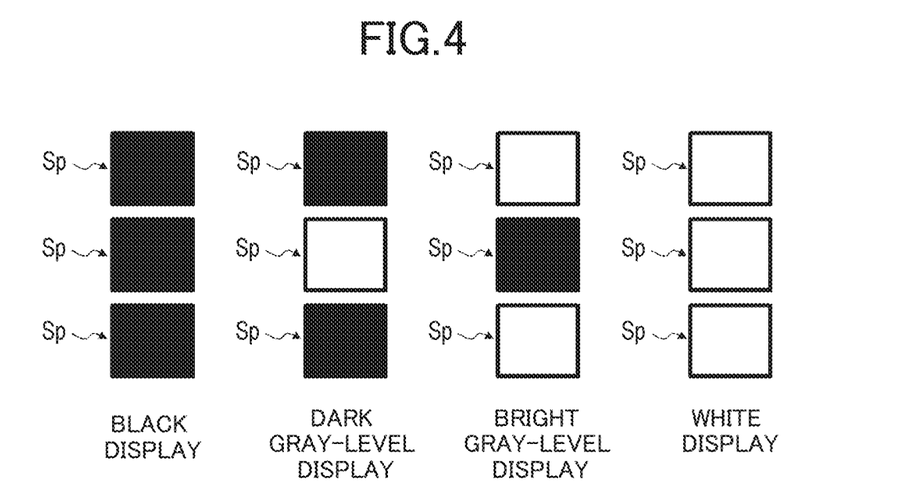
FIG. 4 is an illustration of an exemplary grayscale display produced by area coverage modulation.

Each pixel P in the liquid crystal display device 100 in accordance with the present embodiment is capable of a four-gray-level display by area coverage modulation as shown in FIG. 4. Specifically, when all the three subpixels Sp produce a black display as shown in the leftmost column in FIG. 4, the pixel P as a whole can produce a black display. When two of the subpixels Sp produce a black display with the remaining subpixel Sp producing a white display as show in the second left column in FIG. 4, the pixel P as a whole can produce a dark gray-level display. When two of the subpixels Sp produce a white display with the remaining subpixel Sp producing a black display as shown in the third left column in FIG. 4, the pixel P as a whole can produce a bright gray-level display. When all the three subpixels Sp produce a white display as shown in the rightmost column in FIG. 4, the pixel P as a whole can produce a white display. As described here, since a plurality of the subpixel electrodes 11a includes two or more subpixel electrodes 11a to which different voltages are applied, the pixel P is capable of a grayscale display by area coverage modulation. The three subpixel electrodes 11a may be each electrically connected to a different memory circuit (i.e., the pixel P may include three memory circuits).

In the liquid crystal display device 100 in accordance with an embodiment of the disclosure, the opposite electrode 21 has a plurality of openings 21a as shown in FIGS. 1 and 2B. Each pixel P has at least one opening 21a. More specifically, the opening 21a is provided in an area corresponding to one of the four corners of at least one of the subpixel electrodes 11a in each pixel P (i.e., one of the upper left corner, the upper right corner, the lower right corner, and the lower left corner). There is provided one opening 21a in an area corresponding to one of the four corners of each subpixel electrode 11a in the example shown in FIGS. 1 and 2B.

Those liquid crystal molecules LC in the thickness-wise middle portion of the liquid crystal layer 30 on the subpixel electrodes 11a are orientated in the direction of the openings 21a. In other words, the liquid crystal molecules LC are oriented in the direction of a corner of the subpixel electrode 11a in the thickness-wise middle portion of the liquid crystal layer 30. The opening 21a is provided in the opposite electrode 21 in the area corresponding to the corner.

When the liquid crystal molecules LC are oriented in 0° to 90° directions, this orientation of the liquid crystal molecules LC points at the upper right corner of the subpixel electrode 11a. When the liquid crystal molecules LC are oriented in 90° to 180° directions, this orientation of the liquid crystal molecules LC points at the upper left corner of the subpixel electrode 11a. Similarly, when the liquid crystal molecules LC are oriented in 180° to 270° directions, this orientation of the liquid crystal molecules LC points at the lower left corner of the subpixel electrodes 11a. When the liquid crystal molecules LC are oriented in 270° to 360° (0°) directions, this orientation of the liquid crystal molecules LC points at the lower right corner of the subpixel electrode 11a. For instance, in the example shown in FIG. 3C, those liquid crystal molecules LC in the thickness-wise middle portion of the liquid crystal layer 30 are orientated in the direction of the upper right corner of the subpixel electrode 11a. The opening 21a is provided in a location corresponding to the corner (upper right corner).

In the liquid crystal display device 100 in accordance with the present embodiment, the provision of the openings 21a in the opposite electrode 21 can restrain the generation of bubbles in the opposite substrate 20. This is probably because gas may be generated by the materials for the color filter layer 23 and the overcoat layer 24 in the opposite substrate 20, but released through the openings 21a in the opposite electrode 21 in the manufacture of the opposite substrate 20.

Meanwhile, in a gray-level display (i.e., when different voltages are applied to two adjacent subpixel electrodes 11a), the orientation may become unstable in an area between the two subpixel electrodes 11a ("alignment singularity"), and display quality could fall starting at these singularities due to, for example, image sticking, depending on the locations of the openings 21a. In contrast, in the liquid crystal display device 100 in accordance with the present embodiment, the provision of the openings 21a in the opposite electrode 21 in the locations described above enables prevention of falling display quality such as image sticking attributable to the alignment singularities. The following will specifically describe this prevention by way of comparison with a liquid crystal display device 900 in accordance with a comparative example shown in FIGS. 10 and 11.

Figure 10:
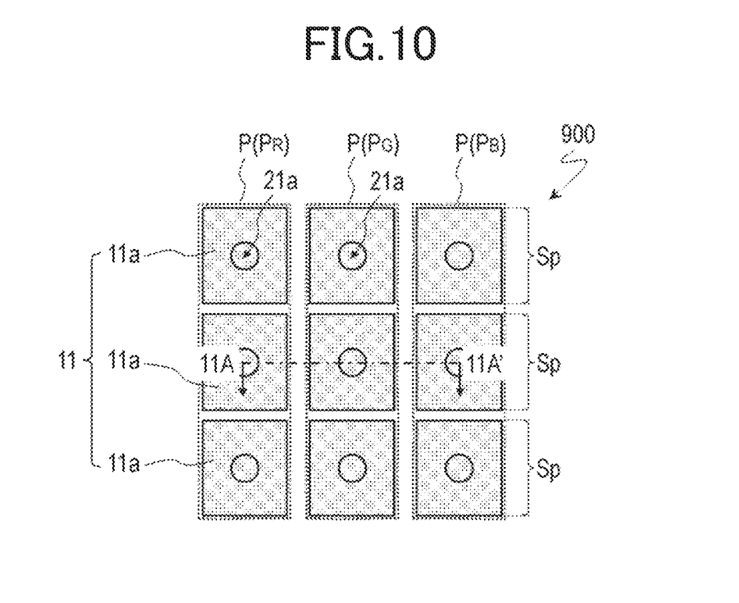
FIG. 10 is a schematic plan view of a liquid crystal display device 900 in accordance with a comparative example, illustrating regions for three pixels P in the liquid crystal display device 900.
Figure 11:
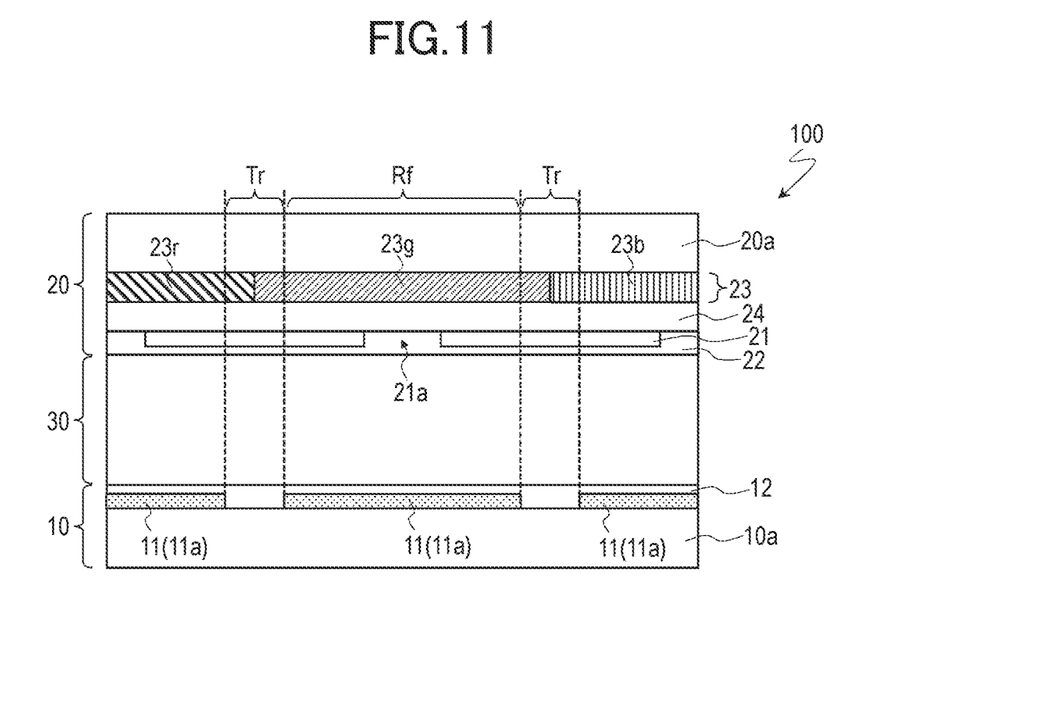
FIG. 11 is a schematic cross-sectional view of the liquid crystal display device 900, illustrating a cross-sectional structure thereof taken along line 11A-11A' shown in FIG. 10.

FIG. 10 is a schematic plan view of the liquid crystal display device 900 in accordance with a comparative example, illustrating regions for three pixels P in the liquid crystal display device 900. FIG. 11 is a schematic cross-sectional view of the liquid crystal display device 900, illustrating a cross-sectional structure thereof taken along line 11A-11A' shown in FIG. 10.

Similarly to the liquid crystal display device 100, the liquid crystal display device 900 includes an opposite electrode 21 that has openings 21a as shown in FIGS. 10 and 11. The liquid crystal display device 900 meanwhile differs from the liquid crystal display device 100 in the layout of the openings 21a in the opposite electrode 21. Referring to FIGS. 10 and 11, in the liquid crystal display device 900, the openings 21a in the opposite electrode 21 are provided substantially at the centers of the subpixels Sp, in other words, in locations overlapping the centers of the subpixel electrodes 11a.

Figure 12A:
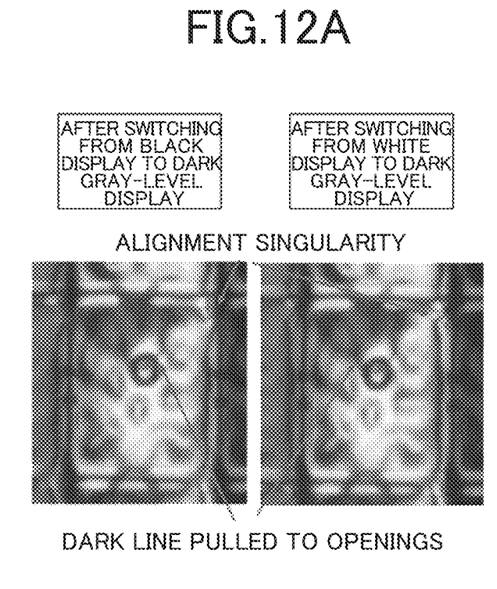
FIG. 12A is a set of an optical microscope image of a subpixel when the liquid crystal display device 900 has switched from a black display to a dark gray-level display and an optical microscope image of a subpixel when the liquid crystal display device 900 has switched from a white display (more precisely, a black grid displayed on the white background) to a dark gray-level display.
Figure 12B:
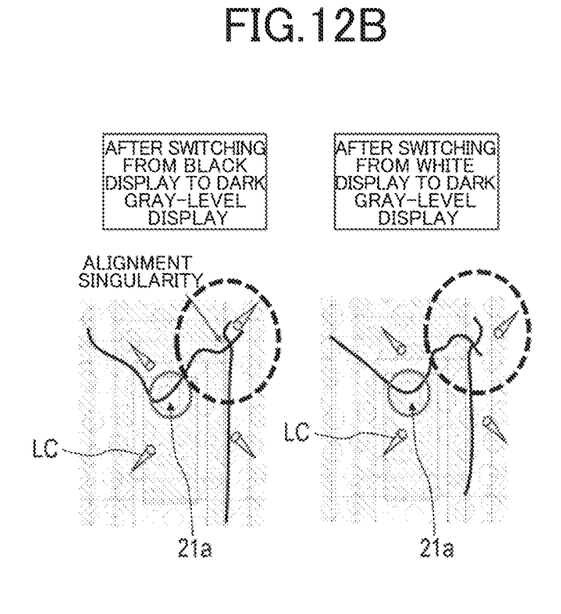
FIG. 12B is a set of a schematic illustration of orientation when the liquid crystal display device 900 has switched from a black display to a dark gray-level display and a schematic illustration of orientation when the liquid crystal display device 900 has switched from a white display (more precisely, a black grid displayed on the white background) to a dark gray-level display.

FIG. 12A is a set of an optical microscope image of a subpixel when the liquid crystal display device 900 in accordance with the comparative example has switched from a black display to a dark gray-level display and an optical microscope image of a subpixel when the liquid crystal display device 900 has switched from a white display (more precisely, a black grid displayed on the white background) to a dark gray-level display. FIG. 12B is a set of schematic illustrations of orientation under these conditions.

FIGS. 12A and 12B show an alignment singularity occurring on a corner of the subpixel Sp (upper right corner in this example) in a gray-level display. The alignment singularity is a boundary point between liquid crystal domains of different orientations. FIGS. 12A and 12B also show a dark line being pulled toward the opening 21a in the subpixel Sp. FIGS. 12A and 12B further show the location of the alignment singularity and the shape of the dark line varying with how the liquid crystal display device 900 switches from a display state to another. Image sticking could occur at, and spread from, the alignment singularity. FIGS. 12A and 12B show the liquid crystal molecules being oriented differently in the same dark gray-level display if the dark gray-level display is reached through switching from a black display and from a white display. If the liquid crystal display device 900 having such display properties produces a black & white pattern display, such as a black grid display on the white background or a black & white checkered pattern display, across the screen and subsequently switches to a dark gray-level display across the screen, the liquid crystal molecules producing a dark gray-level display are oriented differently in some pixels than in other pixels, depending on the pre-switching display pattern. These differences are visually recognizable as display anomalies where the liquid crystal display device 900, despite having switched to a dark gray-level display across the screen, still displays a trace of a previous display pattern such as the grid or the checkered pattern. These display anomalies are termed "image sticking" throughout this specification. The unstable orientation described here is presumably attributable to the two alignment-regulating forces that compete against each other, one exerted by the second vertical alignment film 22 (to determine the pretilt angle) and the other exerted by the opening 21a.

Figure 5A:
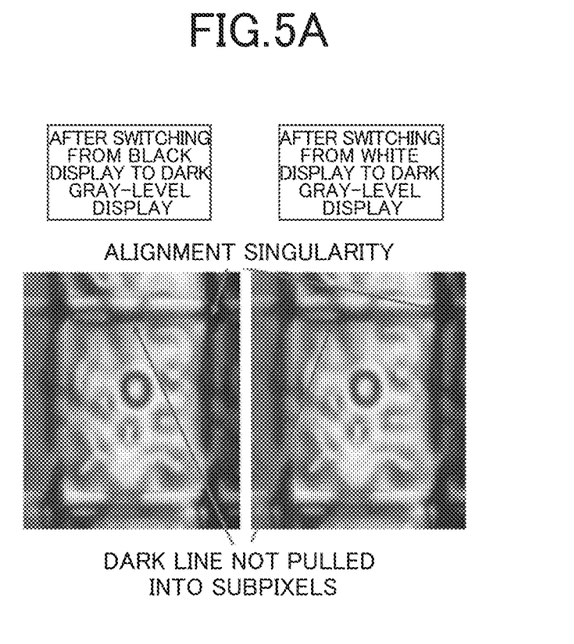
FIG. 5A is a set of an optical microscope image of a subpixel when the liquid crystal display device 100 has switched from a black display to a dark gray-level display and an optical microscope image of a subpixel when the liquid crystal display device 100 has switched from a white display (more precisely, a black grid displayed on the white background) to a dark gray-level display.
Figure 5B:
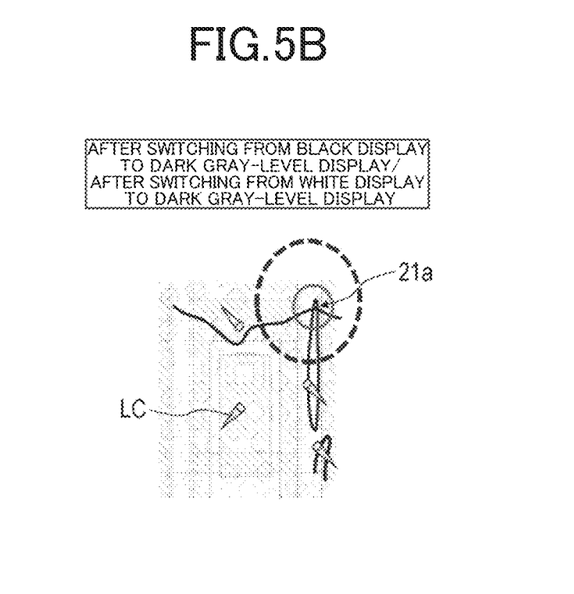
FIG. 5B is a schematic illustration of orientation when the liquid crystal display device 100 has switched from a black display to a dark gray-level display and orientation when the liquid crystal display device 100 has switched from a white display (more precisely, a black grid displayed on the white background) to a dark gray-level display.

FIG. 5A is a set of an optical microscope image of a subpixel when the liquid crystal display device 100 in accordance with the present embodiment has switched from a black display to a dark gray-level display and an optical microscope image of a subpixel when the liquid crystal display device 100 has switched from a white display (more precisely, a black grid displayed on the white background) to a dark gray-level display. FIG. 5B is a schematic illustration of orientation under these conditions.

FIGS. 5A and 5B show an alignment singularity occurring on a corner of the subpixel Sp (upper right corner in this example) in a gray-level display. FIGS. 5A and 5B also show the location of the alignment singularity and the shape of the dark line remaining substantially the same regardless of how the liquid crystal display device 900 switches from a display state to another. FIGS. 5A and 5B further show a dark line not being pulled into the subpixel Sp. The alignment singularity is fixed in a specific location on the corner of the subpixel Sp as described here, which stabilizes the orientation (allows for only one orientation) and hence restrains occurrence of image sticking.

A change in the location of the opening 21a in the opposite electrode 21 from the center of the subpixel Sp to a corner of the subpixel Sp does not adversely affect the optical properties (e.g., reflectance, transmittance, and contrast ratio).

The size of the opening 21a in the opposite electrode 21 is not limited in any particular manner. If the opening 21a is generally circular, the opening 21a has a typical diameter of from 5 µm to 11 µm, both inclusive (e.g., approximately 8 µm). The opening 21a is not necessarily be generally circular and may be generally polygonal or shaped like a slit.

The rubbing direction, chiral pitch, and cell gap of the second vertical alignment film 22 are not necessarily limited to the cited example values. The second vertical alignment film 22 may be rubbed in a direction of, for example, from 150° to 180°, have a chiral pitch of, for example, from 6 µm to 12 µm, both inclusive, and have a cell gap of, for example, from 2.0 µm to 3.6 µm, both inclusive.

Regions between the pixels P are used for a display in transmission mode in the liquid crystal display device 100 in accordance with the present embodiment. The opposite substrate 20 therefore preferably includes no black matrix between any two adjacent pixels P.

Memory Circuit

Figure 6:
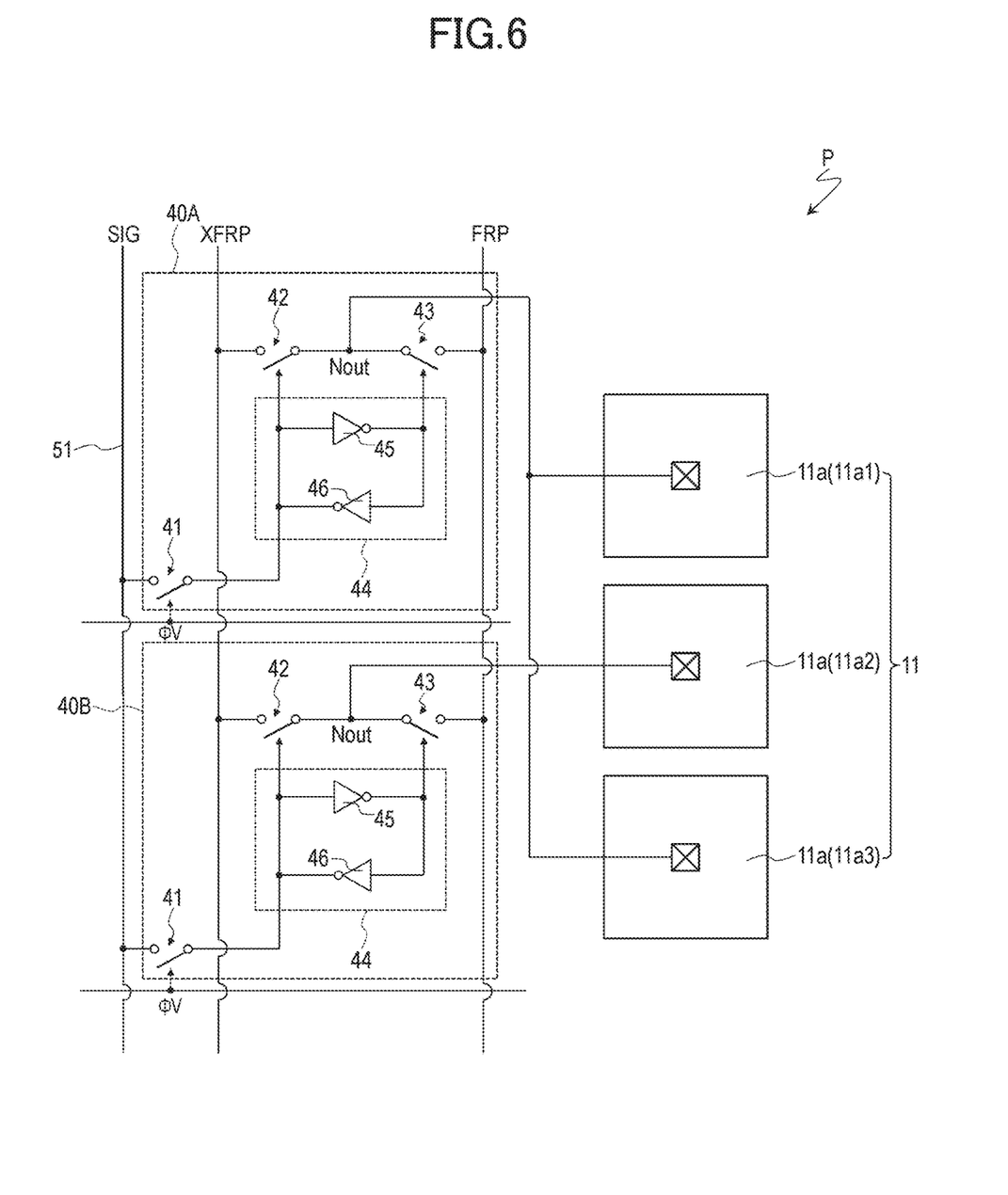
FIG. 6 is a diagram of an exemplary circuit structure of a pixel P in the liquid crystal display device 100.

A description will be given of a structure of a memory circuit with reference to FIG. 6. FIG. 6 is a diagram of an exemplary circuit structure of the pixel P.

The pixel P includes a first memory circuit 40A and a second memory circuit 40B in the example shown in FIG. 6. The first memory circuit 40A is connected to two of the three subpixel electrodes 11a (first subpixel electrode 11a1 and third subpixel electrode 11a3), and the second memory circuit 40B is connected to the remaining subpixel electrode (second subpixel electrode 11a2).

The first memory circuit 40A and the second memory circuit 40B each include a first switching element 41, a second switching element 42, a third switching element 43, and a latch section 44.

The first switching element 41 has an end thereof connected to a signal line 51 and the other end thereof connected to the latch section 44. The first switching element 41 is turned on by a scan signal φV, acquiring data SIG over the signal line 51.

The latch section 44 includes a first inverter 45 and a second inverter 46 that are connected in reverse parallel with each other. The latch section 44 maintains a potential (latches) in accordance with the data SIG acquired by the first switching element 41.

Either the second switching element 42 or the third switching element 43 is selectively turned on in accordance with the polarity of the potential maintained by the latch section 44, thereby sending a control pulse FRP or a control pulse XFRP to the subpixel electrodes 11a. The control pulse FRP is being applied to the opposite electrode 21 and in phase with a common potential Vcom. The control pulse XFRP is being applied to the opposite electrode 21 and in opposite phase with the common potential Vcom. The nodes to which both an end of the second switching element 42 and an end of the third switching element 43 are connected serve as respective output nodes Nout for the first memory circuit 40A and the second memory circuit 40B.

The subpixel Sp produces a black display when the control pulse FRP, which is in phase with the common potential Vcom, is being applied to the subpixel electrode 11a. In contrast, the subpixel Sp produces a white display when the control pulse XFRP, which is in opposite phase with the common potential Vcom, is being applied to the subpixel electrode 11a.

Japanese Unexamined Patent Application Publication No. 2012-145926, as an example, discloses more specific examples of the first switching element 41, the second switching element 42, the third switching element 43, and the latch section 44 for use. The specific structure of the first memory circuit 40A and the second memory circuit 40B is not limited to the example discussed here.

Variation Examples

FIG. 1 and related figures show examples where the opening 21a is formed in the opposite electrode 21 for all the subpixel electrodes 11a. For example, some of the openings 21a may not be formed as in a liquid crystal display device 100A shown in FIG. 7.

Figure 7:
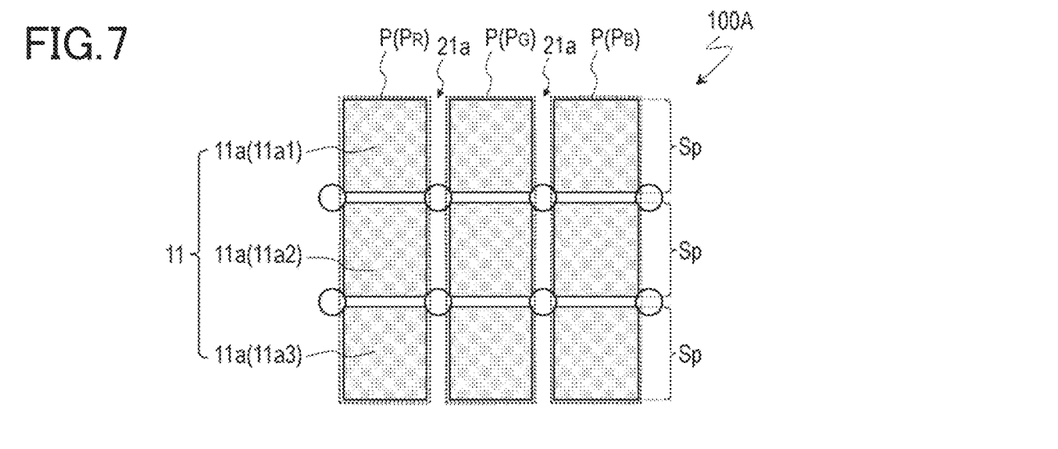
FIG. 7 is a schematic plan view of another liquid crystal display device 100A in accordance with an embodiment of the disclosure, illustrating regions for three pixels P in the liquid crystal display device 100A.

The liquid crystal display device 100A shown in FIG. 7 has the opening 21a provided in an area corresponding to the upper right corner of the second subpixel electrode 11a2 and an area corresponding to the upper right corner of the third subpixel electrode 11a3, but has no opening 21a in an area corresponding to the upper right corner of the first subpixel electrode 11a1. The number (density) of the openings 21a may be adjusted in this manner in accordance with the likelihood of bubbles being generated.

Embodiment 2

Figure 8:
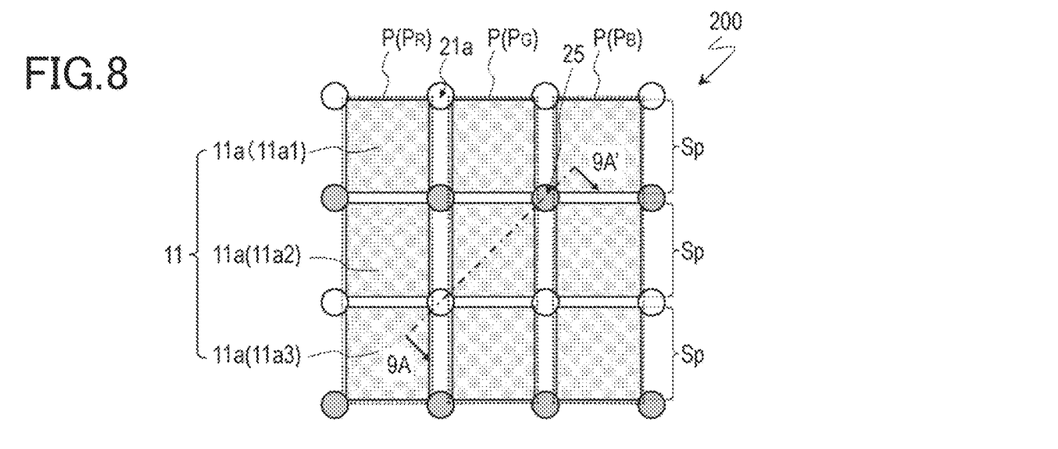
FIG. 8 is a schematic plan view of another liquid crystal display device 200 in accordance with an embodiment of the disclosure, illustrating regions for three pixels P in the liquid crystal display device 200.
Figure 9:
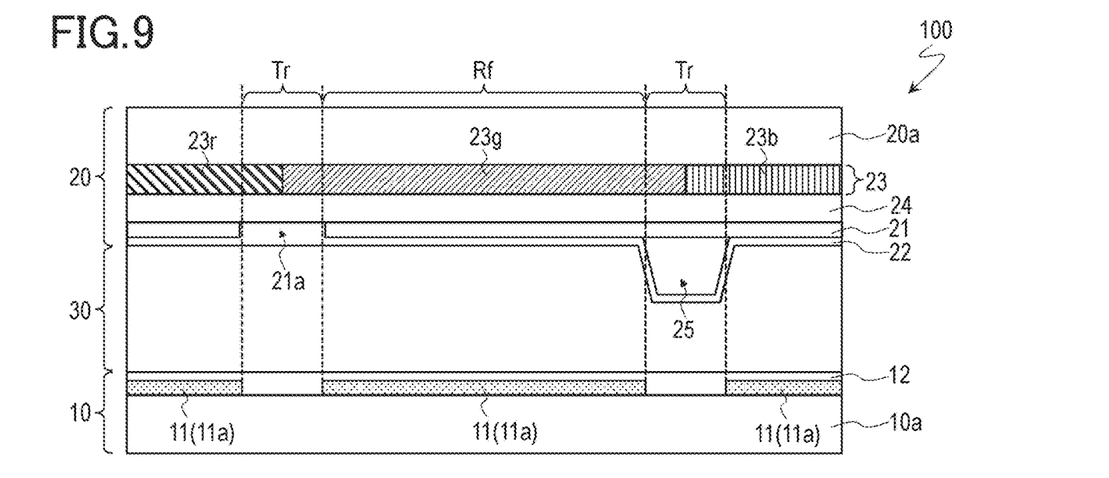
FIG. 9 is a schematic cross-sectional view of the liquid crystal display device 200, illustrating a cross-sectional structure thereof taken along line 9A-9A' shown in FIG. 8.

A description will be given of a liquid crystal display device 200 in accordance with the present embodiment with reference to FIGS. 8 and 9. The liquid crystal display device 200 in accordance with the present embodiment is a transflective liquid crystal display device (transmission/reflection combination type of liquid crystal display device). FIG. 8 is a schematic plan view of the liquid crystal display device 200, illustrating regions for three pixels P in the liquid crystal display device 200. FIG. 9 is a schematic cross-sectional view of the liquid crystal display device 200, illustrating a cross-sectional structure thereof taken along line 9A-9A' in FIG. 1. The following description will focus on differences between the liquid crystal display device 200 and the liquid crystal display device 100 in accordance with Embodiment 1.

The opposite electrode 21 in the present embodiment has openings 21a in areas corresponding to some of the corners (the upper right corners in this example) of some of the subpixel electrodes 11a, more specifically the first subpixel electrodes 11a1 and the third subpixel electrodes 11a3.

The opposite substrate 20 has projections 25 on the opposite electrode 21. The projections 25 are provided in areas corresponding to some of the corners (the upper right corners in this example) of the other subpixel electrodes 11a, more specifically the second subpixel electrode 11a2. The projections 25 are made of, for example, a dielectric material such as resin.

The liquid crystal display device 200 in accordance with the present embodiment replaces some of the openings 21a in the liquid crystal display device 100 in accordance with Embodiment 1 with the projections 25 as described here. The projections 25 are provided in areas corresponding to the corners toward which the liquid crystal molecules LC are oriented in the thickness-wise middle portion of the liquid crystal layer 30 on the subpixel electrodes 11a. The projections 25 serve to stabilize orientation. The liquid crystal display device 200 in accordance with the present embodiment can therefore prevent falling display quality such as image sticking, similarly to the liquid crystal display device 100 in accordance with Embodiment 1.

The projections 25 may have approximately the same diameter as the openings 21a. The projections 25 may have any height. The projections 25 may serve as spacers that determine the thickness (cell gap) of the liquid crystal layer 30.

Reflective Liquid Crystal Display Device

The disclosure has been described by way of embodiments by taking the transflective liquid crystal display device as an example. The liquid crystal display device in accordance with an embodiment of the disclosure may be a reflective liquid crystal display device. In other words, the disclosure is not necessarily used in a liquid crystal display device in which the regions between two pixels P are in transmission mode.

While there have been described what are at present considered to be certain embodiments of the disclosure, it will be understood that various modifications may be made thereto, and it is intended that the appended claim cover all such modifications as fall within the true spirit and scope of the disclosure.

INDUSTRIAL APPLICABILITY

The embodiments of the disclosure are widely applicable to liquid crystal display devices having reflection regions in which the pixels produce a display in reflection mode (i.e., reflective liquid crystal display devices and transflective liquid crystal display devices).

What is claimed is:

1. A liquid crystal display device comprising:
a first substrate;
a second substrate opposite the first substrate;
a liquid crystal layer between the first substrate and the second substrate; and
a plurality of pixels each having a reflection region to produce a display in reflection mode, wherein
the liquid crystal layer contains a nematic liquid crystal material with negative dielectric anisotropy and a chiral agent,
the first substrate includes:
a pixel electrode for each pixel; and
a first vertical alignment film between the pixel electrodes and the liquid crystal layer,
the second substrate includes:
an opposite electrode opposite the pixel electrodes; and
a second vertical alignment film between the opposite electrode and the liquid crystal layer,
of the first vertical alignment film and the second vertical alignment film, only the second vertical alignment film exerts an alignment-regulating force that determines a pretilt angle,
each pixel electrode includes a plurality of subpixel electrodes including at least two subpixel electrodes to which different voltages are applied, the opposite electrode has an opening in an area corresponding to one of four corners of at least one of the plurality of subpixel electrodes, and liquid crystal molecules in a thickness-wise middle portion of the liquid crystal layer on the at least one subpixel electrode are oriented toward the opening.

2. The liquid crystal display device according to claim 1, wherein the opposite electrode has the opening in an area corresponding to one of four corners of each subpixel electrode.

3. The liquid crystal display device according to claim 1, wherein the second substrate has a projection on the opposite electrode in an area corresponding to one of four corners of those subpixel electrodes other than the at least one of the plurality of subpixel electrodes.

4. The liquid crystal display device according to claim 1, wherein the pixel electrode is a reflective electrode made of a light-reflective conductive material.

5. The liquid crystal display device according to claim 1, wherein a region between any two adjacent pixels of the plurality of pixels is used for a display in transmission mode.

6. The liquid crystal display device according to claim 1, wherein the second substrate includes no black matrix between any two adjacent pixels of the plurality of pixels.

7. The liquid crystal display device according to claim 1 further comprising a plurality of memory circuits.

8. The liquid crystal display device according to claim 7, wherein the plurality of memory circuits includes a first memory circuit and a second memory circuit for each pixel, and the plurality of subpixel electrodes includes a subpixel electrode connected to the first memory circuit and a subpixel electrode connected to the second memory circuit.

* * * * *